US009185670B2

(12) United States Patent
Siomina et al.

(10) Patent No.: US 9,185,670 B2
(45) Date of Patent: Nov. 10, 2015

(54) METHOD AND APPARATUS FOR CONFIGURING ENHANCED TIMING MEASUREMENTS INVOLVING MULTIFARIOUS RADIO LINKS

(75) Inventors: Iana Siomina, Solna (SE); Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 143 days.

(21) Appl. No.: 14/125,395

(22) PCT Filed: Jun. 13, 2012

(86) PCT No.: PCT/SE2012/050644
§ 371 (c)(1),
(2), (4) Date: Dec. 11, 2013

(87) PCT Pub. No.: WO2012/173561
PCT Pub. Date: Dec. 20, 2012

(65) Prior Publication Data
US 2014/0133477 A1 May 15, 2014

Related U.S. Application Data

(60) Provisional application No. 61/496,327, filed on Jun. 13, 2011.

(51) Int. Cl.
*H04W 56/00* (2009.01)
(52) U.S. Cl.
CPC .................... *H04W 56/001* (2013.01)
(58) Field of Classification Search
CPC .......... H04W 56/0005; H04W 56/001; H04W 56/0035; H04W 56/0055; H04W 56/0065
See application file for complete search history.

(56) References Cited

U.S. PATENT DOCUMENTS

2010/0222068 A1  9/2010  Gaal et al.

FOREIGN PATENT DOCUMENTS

| WO | 2011142715 A1 | 11/2011 |
| WO | 2012099515 A1 | 7/2012 |
| WO | 2012154106 A1 | 11/2012 |

OTHER PUBLICATIONS

Unknown, Author, "Technology Issues for Heterogeneous Network for LTE-A", Alcatel-Lucent, Alcatel-Lucent Shanghai Bell, 3GPP TSG RAN WG1 #58bis, R1-093788, Miyazaki, Japan, Oct. 12-16, 2009, 1-5.

(Continued)

*Primary Examiner* — Alvin Zhu
(74) *Attorney, Agent, or Firm* — Murphy, Bilak & Homiller, PLLC

(57) ABSTRACT

In its various aspects, the present invention addresses the many challenges associated with making timing measurements involving multifarious radio links. Such measurements are referred to herein as "enhanced" to connote that such timing determinations are being made across multifarious radio links. Here, a radio link will be understood as connecting two radio nodes, and two radio links are considered to be multifarious with respect to each other if they are opposite in terms of uplink and downlink transmit directions, and further if they are associated with different cell identifiers and/or if the two links are between different pairs of radio nodes. In this context, the teachings herein disclose the sharing of "enhanced timing measurement" capability information, e.g., between radio nodes and positioning nodes. Such information indicates the enhanced timing measurement capability of a radio node. Sharing such information enables another node, e.g., a positioning node, to determine an enhanced timing measurement configuration to be used by a radio node. Further, additional teachings herein disclose advantageous configurations for making enhanced timing measurements, and techniques for compensating timing measurements determined from multifarious radio links, e.g., compensating for frequency-dependent propagation time differences.

14 Claims, 8 Drawing Sheets

(56) References Cited

OTHER PUBLICATIONS

Unknown, Author. "3rd Generation Partnership Project; Technical Specification Group Radio Access Network; Evolved Universal Terrestrial Radio Access (E-UTRA); Physical layer; Measurements (Release 10)." 3GPP TS 36.214 V10.1.0. Mar. 2011.

Unknown, Author. "Understanding on Type 1 and Type 2 Relay." R1-091803. Huawei. 3GPP TSG RAN WG1 meeting #57. May 3-8, 2009. San Francisco, USA.

Unknown, Author. "Acquiring synch in CA-based HetNet operations." R1-111773. Ericsson, ST-Ericsson. 3GPP TSG-RAN1 Meeting #65. May 9-13, 2011. Barcelona, Spain.

Unknown, Author. "The Multiple Time Advances in Carrier Aggregation." R2-111953. Huawei, HiSilicon. 3GPP TSG-RAN WG2 Meeting #73bis. Apr. 11-15, 2011. Shanghai, China.

Unknown, Author. "Discussion on RACH based solution and Timing difference based solution." R2-113015. Renesas Mobile Europe. 3GPP TSG-RAN WG2 Meeting #74. May 9-13, 2011. Barcelona, Spain.

Heterogenous network overview though substantive details are available in the relevant Technical Specifications, e.g., TS 36.133 and TS 36.321 for the LTE case, it may be helpful to explain the basics of TA. A User Equipment (UE) initiates a Radio Resource Control (RRC) connection with a supporting LTE network by sending a Random Access Preamble to an eNB, i.e., an LTE base station, also referred to as an eNodeB. The eNB uses the transmission from the UE to estimate the one-way propagation time for the transmission from the UE and sends a corresponding TA value to the UE, for use by the UE in time aligning its transmissions. In particular, the UE adjusts its uplink transmission timing a defined number of subframes after receipt of the TA value in a given sub-frame.

METHOD AND APPARATUS FOR CONFIGURING ENHANCED TIMING MEASUREMENTS INVOLVING MULTIFARIOUS RADIO LINKS

FIELD OF THE INVENTION

The present invention generally relates to wireless communications networks, and particularly relates to radio link timing measurements in such networks.

BACKGROUND

Timing measurements are used in various types of wireless communication networks, for a variety of purposes. For example, Timing Advance (TA) measurements are used in certain types of wireless communication networks, such as those based on the Global System for Mobile Communications (GSM) and Long Term Evolution (LTE) standards. While substantive details are available in the relevant Technical Specifications, e.g., TS 36.133 and TS 36.321 for the LTE case, it may be helpful to explain the basics of TA. A User Equipment (UE) initiates a Radio Resource Control (RRC) connection with a supporting LTE network by sending a Random Access Preamble to an eNB, i.e., an LTE base station, also referred to as an eNodeB. The eNB uses the transmission from the UE to estimate the one-way propagation time for the transmission from the UE and sends a corresponding TA value to the UE, for use by the UE in time aligning its transmissions. In particular, the UE adjusts its uplink transmission timing a defined number of subframes after receipt of the TA value in a given sub-frame.

Of course, TA determination is only one of many examples. Both mobile wireless communication devices (e.g., UEs) and base stations, e.g., eNBs, make various timing measurements, including timing-based range measurements at various times and for various reasons, including for positioning. The various examples of timing-based range measurements include receive-transmit time difference measurements. At a UE, for example, the Receive-Transmit (Rx-Tx) time difference measurement is defined as the time difference between the receive timing of downlink radio frame #i at the UE, and the UE transmit timing of uplink radio frame #i. At the eNB, the Rx-Tx time difference is defined as the difference between the receive timing of uplink radio frame #i (for the path that is first detected in time) and the transmit timing of the downlink radio frame #i. See TS 36.214 for more detailed timing measurement examples in the LTE context.

The current version of TS 36.133 also specifies requirements on UE capabilities for support of event triggering and reporting criteria. The current requirements are primarily defined for the mobility measurements. The requirements include: a set of reporting criteria categories; the number of reporting criteria per category that UE shall be able to support in parallel; and the maximum total number of reporting criteria. The current set of reporting criteria in Rel. 9 includes three measurement categories used for mobility: intra-frequency, inter-frequency and inter-RAT measurements, as well as for legacy positioning measurements, namely OTDOA RSTD and UE Rx-Tx time difference measurements.

For the intra-frequency category, measurements for up to nine E-UTRAN intra-frequency cells may be configured in parallel. For the inter-frequency category, measurements of up to seven E-UTRAN inter-frequency cells and four positioning measurements may be configured in parallel. And for inter-RAT, up to five parallel measurements per supported RAT are supported. The maximum total number of reporting criteria is currently twenty-five. This means that, depending upon the UE capability (e.g. inter-RAT capabilities), an eNode B can configure a UE to perform up to twenty-five measurements in parallel. As long as the measurement configuration does not exceed the reporting criteria requirements above, the UE is required to meet the relevant performance requirements, e.g., measurement reporting delay, measurement accuracy of the configured measurements, etc.

Although these and other example timing measurements are well known in the wireless communication arts, the continuing evolution of wireless communication networks presents numerous issues, which are not well understood in the context of, for example, multipoint transmission/reception scenarios, including Distributed Antenna Systems (DAS), service involving multiple Remote Radio Heads (RRH), Multiple-Input-Multiple-Output (MIMO) service, in at least some cases, Coordinated Multipoint (CoMP) service scenarios, and diversity transmission scenarios. Complications not addressed in conventional approaches to timing measurements also arise in Carrier Aggregation (CA) service scenarios.

CA, also referred to as multi-carrier service, allows a UE to receive and/or transmit data simultaneously over more than one carrier frequency. Each carrier frequency is often referred to as a component carrier (CC) or simply a serving cell in the serving sector. Notably, CA is supported for both contiguous and non-contiguous component carriers, and component carriers originating from the same eNB need not provide the same coverage.

CA is used in both LTE and High Speed Packet Access (HSPA), and when CA is in use, a UE will have a primary serving cell (Pcell) and one or more secondary serving cells (Scells) operating on a secondary carrier frequency or frequencies. For the downlink, the carrier corresponding to the Pcell is the Downlink Primary Component Carrier (DL PCC), while in the uplink it is the Uplink Primary Component Carrier (UL PCC). Depending on UE capabilities, the Scells and the Pcell form a set of serving cells for the UE.

The above scenarios all may be regarded as involving "multifarious" radio links. One radio link is multifarious with respect to another radio link if the two links are opposite in terms of uplink and downlink transmit directions and further if they connect different pairs of radio nodes, i.e., the two links are not between the same pairing of two radio nodes in a network, and/or if they are associated with different cell identifiers. Different cell identifiers for two radio links implies two base stations that are geographically separated and/or implies the use of different carrier frequency bands for the two radio links. The use of multifarious radio links introduces significant challenges with respect to timing measurements, including the various timing-based range measurements associated with, e.g., mobile device positioning.

SUMMARY

In its various aspects, the present invention addresses the many challenges associated with making timing measurements involving multifarious radio links. Such measurements are referred to herein as "enhanced" to connote that such timing determinations are being made across multifarious radio links. Here, a radio link will be understood as connecting two radio nodes, and two radio links are considered to be multifarious with respect to each other if they are opposite in terms of uplink and downlink transmit directions, and further if they are associated with different cell identifiers and/or if the two links are between different pairs of radio nodes. In this context, the teachings herein disclose the sharing of "enhanced timing measurement" capability information, e.g., between radio nodes and positioning nodes. Such information indicates the enhanced timing measurement capability of a radio node. Sharing such information enables another node, e.g., a positioning node, to determine an enhanced timing measurement configuration to be used by a radio node. Further, additional teachings herein disclose advantageous configurations for making enhanced timing measurements, and techniques for compensating timing measurements determined from multifarious radio links, e.g., compensating for frequency-dependent propagation time differences.

With the above in mind, in some embodiments, a first radio node is configured for operation in a wireless communication network and comprises a wireless communication transceiver and an enhanced timing determination circuit that is configured to make enhanced timing measurements—i.e., timing measurements that interrelate multifarious radio links. For example, the enhanced timing determination circuit is configured to determine receive/transmit time differences, one-way propagation delays, and/or round-trip-times, based on radio link timings measured or known for two or more radio links that are multifarious as defined herein. Such interrelation enables the radio node having an enhanced timing determination circuit to make timing measurements that span different Radio Access Technologies (RATs), or that span different cells in a Carrier Aggregation (CA) or Coordinated MultiPoint (CoMP) service configuration, or in "HetNets" involving macro and pico base stations that are geographically separated and/or that operate in different carrier frequency bands.

In an example of the first radio node, the wireless communication transceiver is configured to communicate with a second radio node in the wireless communication network via a first radio link that is multifarious with respect to a second radio link involving either the first or second radio node. Correspondingly, the enhanced timing determination circuit is configured to determine an enhanced timing measurement by interrelating radio link timing across the first and second multifarious radio links. The radio node also may include an enhanced timing measurement configuration circuit that is operatively associated with the wireless communication transceiver and the enhanced timing determination circuit. In such embodiments, the enhanced timing measurement configuration circuit is configured to report the enhanced timing measurement capability of the radio node and/or configure the enhanced timing measurements made by the radio node according to enhanced timing measurement configuration information received from another node in the network.

The first radio node may be a user equipment (UE) having an uplink with one base station and a downlink with another base station. Here, the uplink and the downlink are an example of first and second multifarious radio links, as they are in opposite transmit directions and involve different pairs of radio nodes—i.e., the UE and one base station on the uplink, and the UE and the other base station on the downlink. An enhanced timing measurement by the UE in this scenario interrelates radio link timing across the uplink and downlink, even though the uplink and downlink involve different base stations. The UE may make direct timing measurements on both such links, or it may make measurements on one of the links, which are dependent on the radio link timing measured by or sent to the UE for the other link.

Similarly, if the first radio node is a first base station, e.g., an eNodeB in a Long Term Evolution (LTE) network, the first radio node may determine an enhanced timing measurement that interrelates the radio link timing on an uplink or downlink between it and a UE with the radio link timing on a downlink or uplink between the UE and a second base station, where in some embodiments, one of the links may be an uplink and one of the links may be a downlink. Inter-base-station communications are used, for example, to provide the first base station with radio link timing information relating to the other link. Timing information also may be shared across carrier frequency bands, such as where the multifarious radio links represent different carrier frequency bands and/or different RATs. As for the determination of enhanced timing measurement configurations to be used by such radio nodes, in some embodiments a node in the network is configured to provide such configuration services. The node may be essentially any type of node within the network, although it is advantageous to configure certain node types for such operation. For example, given the involvement of positioning nodes, such as E-SMLCs in an LTE embodiment, in various timing-based range measurements used for UE positioning, it is contemplated herein to configure a positioning node to provide enhanced timing measurement configuration services. In another non-limiting example, a base station is so configured. In yet another example, an operations and maintenance (OMA) node is so configured.

Regardless, such a node comprises one or more communication interfaces configured for communicating with one or more radio nodes in the network. Such communication may be direct, at a corresponding network layer, or may be indirect, and the radio node(s) may be base stations and/or UEs. In any case, the node includes one or more processing circuits that are operatively associated with the one or more communication interfaces and configured to receive enhanced timing measurement capability information for a radio node. As noted, the enhanced timing measurement capability information indicates whether or to what extent the radio node can make enhanced timing measurements involving multifarious radio links. For example, the capability information may indicate a maximum frequency difference between multifarious radio links that can be accommodated by the radio node.

The node's processing circuit(s) are configured to determine an enhanced timing measurement configuration to be used by the radio node, based on the enhanced timing measurement capability information received for the radio node, and further based on network configuration information relevant to determining enhanced timing measurements at a radio node. The processing circuits are further configured to send signaling indicating said enhanced timing measurement configuration to the radio node, to control the enhanced timing measurements performed by the radio node.

A related method implemented in a node within the network includes receiving enhanced timing measurement capability information for a radio node, determining an enhanced timing measurement configuration to be used by the radio node, based on said enhanced timing measurement capability information and further based on network configuration information relevant to making an enhanced timing measurement at the radio node, and sending signaling indicating said enhanced timing measurement configuration to the radio node, to control the enhanced timing measurements performed by the radio node.

In an example case, the node determines the enhanced timing measurement configuration by selecting which multifarious radio links are to be used by the radio node in making the enhanced timing measurement based on minimizing a frequency distance between two or more of the multifarious radio links that are to be used. That is, the network configuration information may indicate which multifarious radio links to select for making the enhanced timing measurement, such as by providing selection criteria, such as by indicating any one or more of a maximum frequency distance permissible between links, a maximum physical distance between the radio nodes involved, and/or in view of other variables, such as timing accuracy requirements, the measurement type involved, etc.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
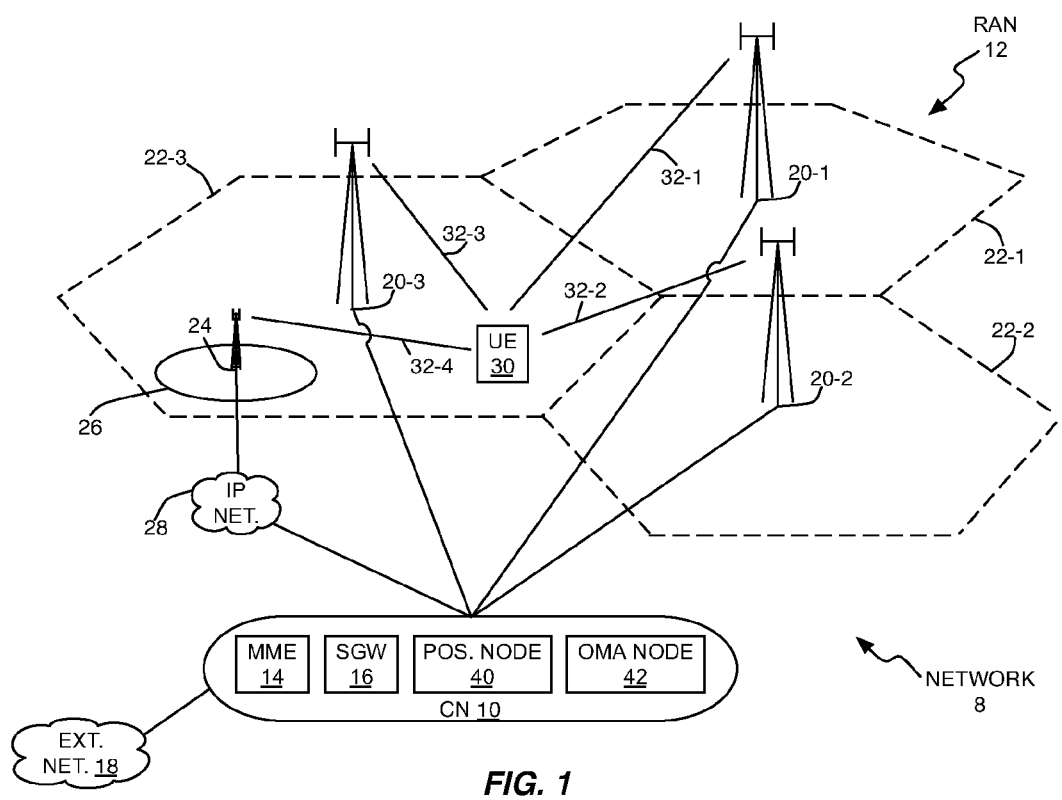
FIG. 1 is a partial block diagram of a wireless communication network, wherein one or more entities are configured to perform or configure enhanced timing measurements involving multifarious radio links, such as made by radio nodes like base stations and user equipments.

FIG. 1 illustrates an example wireless communication network 8 that includes a Core Network (CN) 10, and a Radio Access Network (RAN) 12. The CN 10 includes various entities. By way of example FIG. 1 illustrates several CN entities, including a Mobility Management Entity or MME 14, and a Serving Gateway or SGW 16. The SGW 16 and/or other nodes (not shown) provide communicative connectivity to one or more external networks 18, such as other wireless networks and/or other types of telecommunication networks, the Internet, etc.

The RAN 12 includes a number of base stations 20 (e.g., 20-1, 20-2, and so on), with each base station 20 providing radio service in one or more "cells" 22 (e.g., 22-1, 22-2, and so on). Here, it will be understood that the term "cell" has broad meaning and may mean logical or physical cells.

Figure 2:
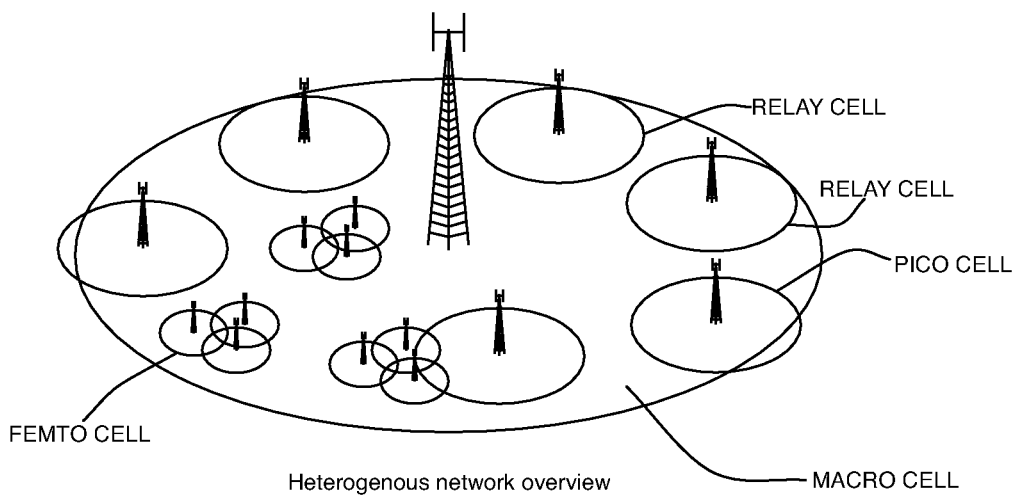
FIG. 2 is a block diagram of an example arrangement known for heterogeneous networks.

As a non-limiting example, one sees a further base station 24 in FIG. 1 that provides a cell 26, which overlays the cell 22-3. The base station 24 may be the same type as the other illustrated base stations 20, and likewise the cell 26 may be of the same general type as the other cells 22, however, the different numeric labels used here simplify the discussion with respect to describing a "heterogeneous" network embodiment—a "HetNet." In an example HetNet scenario, the base stations 20 are "macro" base stations intended to provide service over relatively large cells 22, while the base station 24 is a micro base station that provides coverage over a smaller cell 26. Merely by way of example, FIG. 2 illustrates an example arrangement of macro and pico cells, such as is known for HetNets.

Returning to FIG. 1, one sees that the cell 26 overlays a portion of the cell 22-3 and may provide higher data rate service in the overlaid area, or may provide improved coverage, or may provide "private" access, such as in the case where only UEs listed in a Closed Subscriber Group (CSG) data set are permitted to access the network 8 through the base station 24. Here, the base station 24 may link to the CN 10 using a secure connection through an IP network 28. Examples of the base station 24 include "pico" or "femto" base stations, such as home gateways. LTE standards refer to such home gateways as Home eNBs or HeNBs.

The RAN 12 provides the air interface that communicatively couples UEs 30 to the CN 10 and any external networks 18 that are accessible through the CN 10. Here, the term "UE" should be given broad construction to mean not only "user equipment" in the sense of 3GPP standards, but also essentially any type of wireless communication device, such as mobile phones, tablets, laptops or other computers, and various other "connected" devices, such as network modems, etc.

Although the RAN 12 can support many UEs 30, for simplification FIG. 1 depicts a single example UE 30 being supported by the RAN 12. Here "supported" means that the UE 30 is connected or otherwise registered in the network 8 and can thus communicate via the network 8. In particular, FIG. 1 depicts the UE 30 as having a number of actual or possible radio links 32 with the RAN 12. One sees, for example, a radio link 32-1 to base station 20-1, a radio link 32-2 to base station 20-2, a radio link 32-3 to base station 20-3, and a radio link 32-4 to base station 24. Each one of these radio links 32 may be a downlink (DL) from the network 8 to the UE 30, or an uplink (UL) from the UE 30 to the network 8, or both. In the context of this disclosure, two radio links 32 are considered to be "multifarious" if they are opposite in terms of uplink and downlink transmit directions and further if they are between different pairs of radio nodes 20, 30 and/or have different cell identifiers. Here, it is assumed that two radio links 32 that are in different carrier frequency bands will have different cell identifiers associated with them.

Depending on the type of network 8, the configuration and capability of the UE 30, current reception conditions, current service types, etc., the UE 30 may have a lesser or greater number of radio links 32 to the RAN 12. In any case, the teachings herein disclose various techniques for making timing-related measurements, including timing-based range measurements, across two or more radio links 32 that are multifarious. As noted earlier herein, the term "enhanced timing measurement" is used to connote a timing measurement that involves multifarious radio links 32.

While the example UE 30 has enhanced timing measurement capabilities, not all UEs necessarily will have such capabilities. Further, different UEs having enhanced measurement capabilities may not have the same enhanced timing measurement capabilities. For example, certain UEs may be limited in the range or span of frequencies that can be involved in making an enhanced timing measurement. Thus, it is contemplated herein that the enhanced timing measurement capabilities of a UE 30 and/or a base station 20 may need to be reported or otherwise indicated. It is further contemplated that the particular configuration used by a base station 20 and/or a UE 30 for making an enhanced timing measurement may need to be configured, e.g., to comport with the enhanced timing measurement capabilities of the base station 20 and/or UE 30, or to otherwise select the radio links 32 or other measurement parameters that are most favorable for the multifarious link scenario at issue. In this regard, it will be appreciated that base stations 20 and UEs 30 represent types of "radio nodes," and that use of that term herein will be understood as referring to either or both such types, unless a specific distinction is provided in context.

In some embodiments, a radio node reports its enhanced timing measurement capabilities and the reported information is then used in configuring the enhanced timing measurement(s) to be made by the reporting radio node. For example, the enhanced timing measurement configuration is determined by the configuring node selecting the particular radio carriers to be used. The enhanced timing measurement configuration is shared between the node that determined the configuration and the radio node making the multifarious link timing measurements. For example, see the positioning node 40 and/or the OMA node 42 shown in FIG. 1. In some embodiments, either such node is configured to receive enhanced timing measurement capability information from a radio node, and to return enhanced timing measurement configuration information to the radio node, where the configuration is based on the reported capability and on network configuration information that, for example, indicates the multifarious radio links that are candidates for making an enhanced timing measurement at the radio node.

Figure 3:
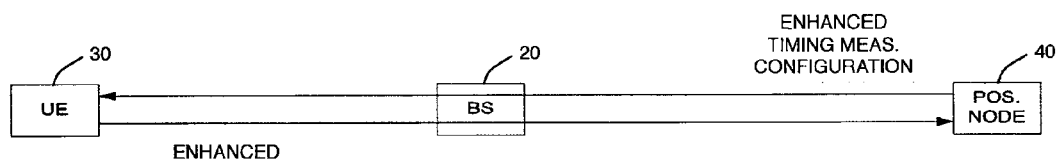
FIGS. 3-5 are block diagrams illustrating multiple embodiments of enhanced timing measurement capability reporting and enhanced timing measurement configuration.

FIG. 3 provides a non-limiting example of such reporting and configuring. The depicted UE 30 is configured to report or otherwise send its enhanced timing measurement capabilities and a positioning node 40 in the network 8 receives this reported enhanced timing measurement capability information. Thus, FIG. 3 further depicts enhanced timing measurement configuration information outgoing from the positioning node 40 to the UE 30. As explained, the positioning node 40 determines such configuration information based on the UE 30 reporting its enhanced timing measurement capability information to the positioning node 40. Further, the positioning node 40 may consider knowledge of the particular network configuration that is being used, or that will be used, to serve the UE 30, such as, for example, knowledge of the different carrier frequencies and bandwidths, when determining the enhanced timing measurement configuration of the UE 30.

FIG. 3 also shows the enhanced timing measurement capability information for the UE 30 as passing through a base station 20, and shows the corresponding enhanced timing measurement configuration information passing back through the base station 20, from the positioning node 40 to the UE 30. Such information is carried, for example, transparently through the base station 20 using a signaling protocol between the positioning node 40 and the UE 30. Note that this might also apply to the base station 24 and unless noted otherwise, references hereafter to "base station 20" can be understood as equivalently referring to the base station 24 in FIG. 1.

Figure 4:
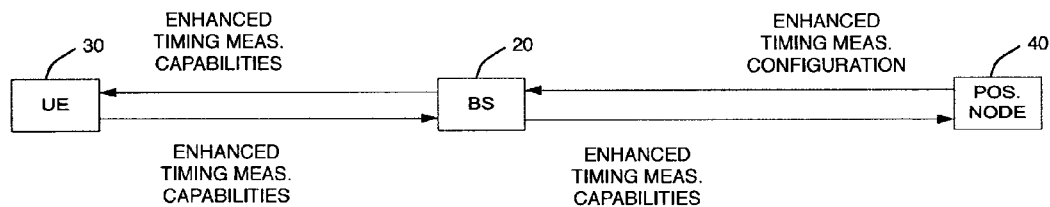

On the other hand, FIG. 4 shows an example case where the base station 20 receives enhanced timing measurement capability information from the UE 30 and configures the UE's enhanced timing measurement accordingly, and where the positioning node 40 receives enhanced timing measurement capability information from the base station 20 for the base station 20 and configures the base station's enhanced timing measurement accordingly. In another variation, FIG. 4 can be understood as showing the base station 20 receiving enhanced timing measurement capability information from the UE 30 in BS-to-UE signaling, and forwarding that information to the positioning node 40 by conducting its own signaling exchange with the positioning node 40. In such cases, the base station 20 receives enhanced timing measurement configuration information for the UE 30 from the positioning node 40, and forwards that information on to the UE 30 via its own signaling exchange with the UE 30.

Figure 5:
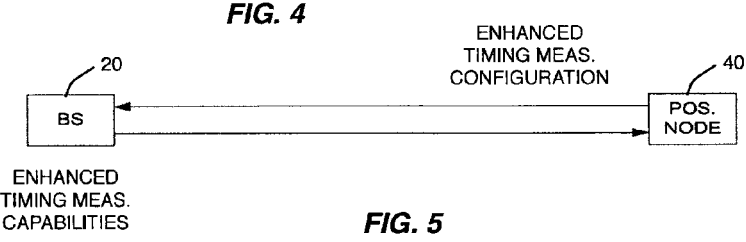

FIG. 5 illustrates that the positioning node 40 may configure enhanced timing measurements for the base station 20, based on receiving enhanced timing measurement capability information from the base station 20, irrespective of whether it also configures such timing measurements for one or more UEs 30. Indeed, it will be understood that the base stations 20 and the UEs 30 do not necessarily make the same kinds of enhanced timing measurements, nor do they necessarily use the same enhanced timing measurement configurations, nor do they necessarily make such measurements at the same time. Thus, the positioning node 40, an MME 14, an OMA node 42, or some other node in the network 8, may evaluate separate enhanced timing measurement capability information from a base station 20 and a UE 30 supported by that base station 20, and provide separate enhanced timing measurement configuration information to the base station 20 and the UE 30.

Of course, as noted, it is also taught herein that such a node evaluates network configuration information relevant to an enhanced timing measurement to be made by a radio node 20, 30, and considers that information when determining the enhanced timing measurement configuration for the radio node 20, 30. In an example, the enhanced timing measurement configuration specifies which ones of the candidate radio links 32 to use in making the timing measurements. The node in the network 8 might, for example, consider the various frequency distances between the different carrier frequencies associated with two or more of the radio links 32 available for use in making an enhanced timing measurement at the radio node 20, 30 and pick the particular radio links 32 to be used for making the enhanced timing measurement based on minimizing the frequency distance. That approach minimizes the propagation time differences of between radio links 32 in different carrier frequency bands.

Figure 6:
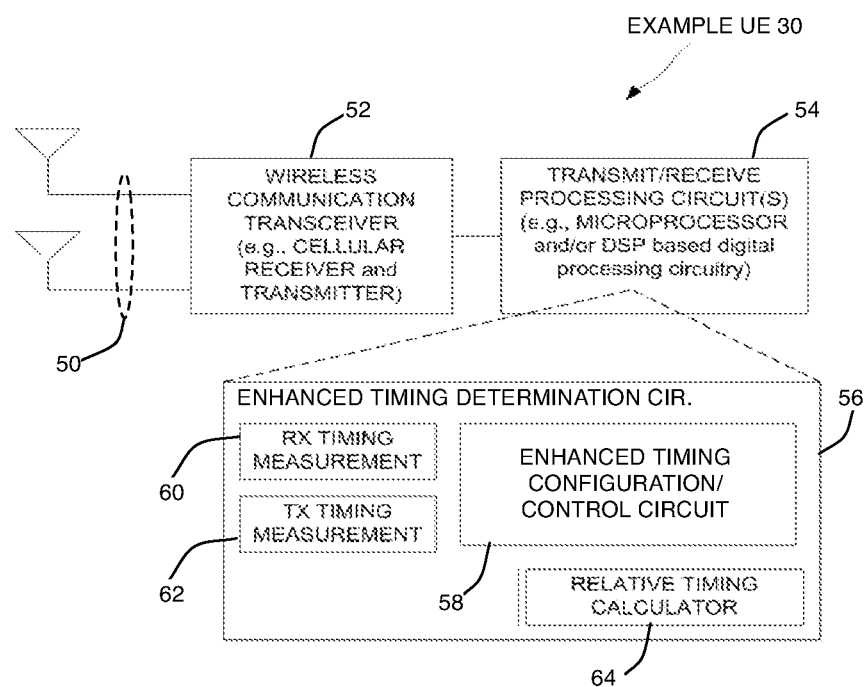
FIG. 6 is a block diagram of one embodiment of a user equipment (UE), which is a type of radio node and which is configured to make enhanced timing measurements.

The configurability of a radio node 20, 30 with respect to making enhanced timing measurements on multifarious radio links and, indeed, the base ability of a radio node to make enhanced timing measurements at all, depends on the radio node architecture, e.g., its functional circuitry arrangements. In that regard, FIG. 6 illustrates an example UE configuration wherein the illustrated UE 30 comprises one or more transmit/receive antennas 50, a wireless communication transceiver 52, and associated transmit/receive processing circuits 54, e.g., microprocessor-based circuitry. The transmit/receive processing circuits 54 include an enhanced timing determination circuit 56, which at least functionally includes an enhanced timing measurement configuration and control circuit 58, a receive (RX) timing measurement circuit 60 and/or a transmit (TX) timing measurement circuit 62, along with a relative timing calculator 64 that is configured to interrelate the radio link timing across two or more multifarious radio links 32.

Figure 8:
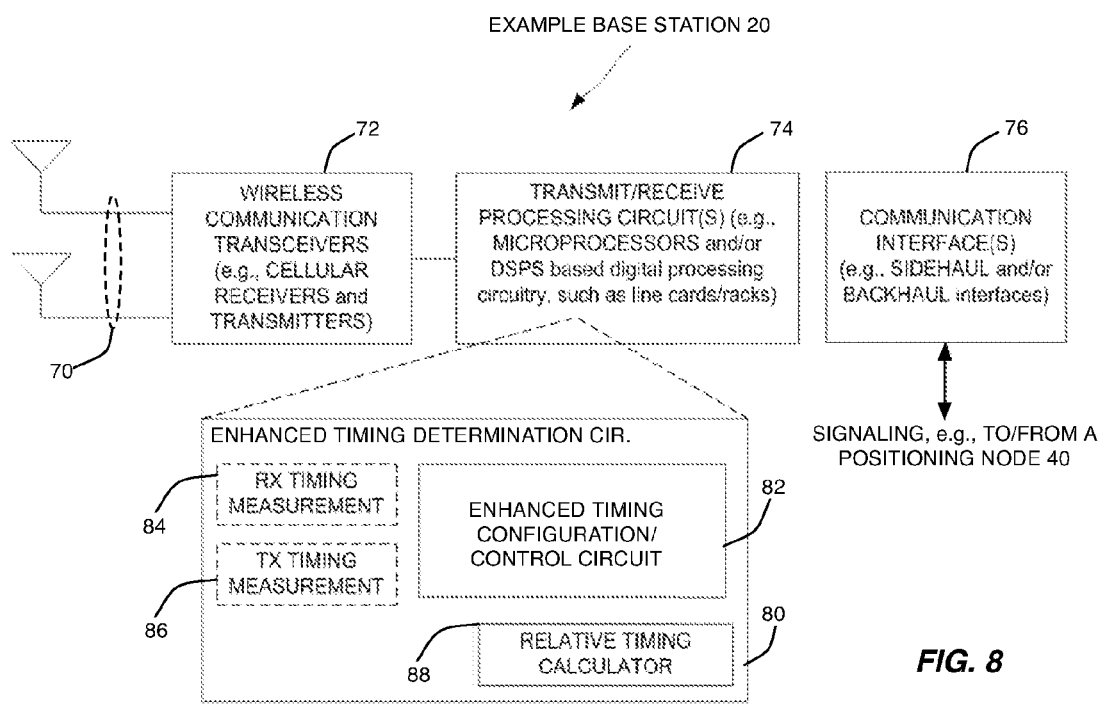
FIG. 8 is a block diagram of one embodiment of a base station, which is another type of radio node and is configured to make and/or configure enhanced timing measurements.

FIG. 8 provides similar details for the base station 20, where the base station 20 includes one or more transmit/receive antennas 70, a wireless communication transceiver 72 and associated transmit/receive processing circuits 74, one or more additional communication interfaces 76, such as sidehaul and backhaul interfaces for communicating with other base stations 20 and other nodes in the network 8, respectively.

The transmit/receive processing circuits 74 include an enhanced timing determination circuit 80, which may provide the same or similar functionality as the enhanced timing determination circuit 56 in the UE 30, in terms of making enhanced timing measurements, but which also may be configured to determine the enhanced timing measurement configuration for other radio nodes, e.g., UEs 30. Thus, the timing determination circuit 80 at least functionally includes an enhanced timing measurement configuration/control circuit 82, one or both of a RX timing measurement circuit 84 and a TX timing measurement circuit 86, and a relative timing calculator 88 that is configured to interrelate the radio link timing across two or more multifarious radio links 32.

Thus, this disclosure teaches a first radio node 20, 30 that is configured for operation in a wireless communication network 8 and comprises a wireless communication transceiver 52, 72 configured to communicate with an another radio node in the network 8 on a first radio link 32-1 that is multifarious with respect to a second radio link 32-2 that involves one of the first and second radio nodes 20, 30 and another radio node 20, 30. The first radio node 20, 30 further includes an enhanced timing determination circuit 56, 80 that is configured to determine an enhanced timing measurement by interrelating radio link timing across the first and second radio links 32-1, 32-2. For example, a UE 30 receives from a first base station 20-1 on a first radio link 32-1 and transmits to a second base station 20-2 on a second radio link 32-2, and the enhanced timing determination circuit 56 of the UE 30 makes one or more enhanced timing measurements that interrelate radio link timing across that uplink and downlink. More broadly, for the case where the first radio link 32-1 is transmitted by the first radio node 20, 30, the second radio link 32-2 is transmitted by the second radio node 20, 30, and for the case where the first radio link 32-1 is transmitted by the second radio node 20, 30, the second radio link 32-2 is transmitted by the first radio node 20, 30. Further, the enhanced timing determination circuit 56, 80 is configured to interrelate a receive timing measured or known for one of the first or second radio links 32-1, 32-2 with a transmit timing measured or known for the other one of the first or second radio links 32-1, 32-2, thereby interrelating transmit and receive timings across the different pairs of radio nodes 20, 30 and/or across the different cell identifiers.

As another example, in cases where the first radio node 20, 30 includes an enhanced timing measurement configuration circuit 58, 82, such a circuit is operatively associated with the wireless communication transceiver 52, 72 and the enhanced timing determination circuit 56, 80. The enhanced timing measurement configuration circuit 58, 82 is configured to report an enhanced timing measurement capability of the first radio node 20, 30, so that one or more other radio nodes 20, 30 and/or network nodes, e.g., positioning node 40 and/or OMA node 42, in the network 8 are apprised of the enhanced timing measurement capability of the first radio node 20, 30.

Additionally, or alternatively, the enhanced timing measurement configuration circuit 58, 82 is configured to configure the enhanced timing measurement to be made by the enhanced timing determination circuit 56, 80, in response to enhanced timing measurement configuration information received from another radio node 20, 30, or received from a network node, e.g., 40, 42, in the network 8. In an example, case, configuring the enhanced timing measurement includes at least one of: selecting which radio links 32 are used as said first and second links 32-1, 32-2; and selecting a type of timing measurement to be performed as said enhanced timing measurement.

Thus, in at least some embodiments, the radio node 20, 30 selects first and second radio links 32-1, 32-2 for use in making an enhanced timing measurement, based on the enhanced timing measurement configuration received by the radio node 20, 30. For example, the radio node 20, 30 chooses which radio links 32 are used for making an enhanced timing measurement according to the enhanced timing measurement configuration. For example, the enhanced timing measurement configuration may include a value indicating the maximum carrier frequency distance permissible, and the radio node 20, 30 may select the multifarious radio links 32 used in the enhanced timing measurement such that differences in carrier frequencies do not exceed the maximum. Other requirements may be additionally or alternatively indicated by the enhanced timing measurement configuration, and the radio node 20, 30 generally will conform its selection of radio links 32 in accordance with the configuration.

The radio node 20, 30 also may be configured to operate in a carrier aggregation (CA) or a coordinated multipoint (CoMP) configuration with respect to a second radio node 20, 30, where the first radio link 32-1 is a serving or primary carrier for the CA or CoMP configuration, and the second radio link 32-2 is a secondary carrier for the CA or CoMP configuration. In another example, the first radio link 32-1 is at a first frequency band and the second radio link 32-2 is at a different, second frequency band, said enhanced timing measurement thereby interrelating radio link timing across the first and second frequency bands.

As further examples, the enhanced timing measurement comprises any one of: an Rx-Tx time difference measurement that interrelates the first and second radio links 32-1, 32-2; a round trip time (RTT) measurement that interrelates the first and second radio links 32-1, 32-2; and a Timing Advance or one-way propagation delay measurement for one of said first and second radio links 32-1, 32-2 determined in dependence on a timing of the other one of said first and second radio links 32-1, 32-2. In some embodiments, one of the two example multifarious radio links 32-1 and 32-2 may be a first uplink or downlink between the first and second radio nodes 20, 30 that is associated with a first cell identifier. The other one of the two multifarious radio links 32-2 may be a second uplink or downlink either between the first and second radio nodes 20, 30 or between one of said first and second radio nodes 20, 30 and another radio node in the wireless communication network 8. Here, the second uplink or downlink is associated with a second cell identifier, so that said enhanced timing measurement interrelates radio link timing across the first and second cell identifiers. Still further, one of the two example multifarious radio links 32-1 and 32-2 may be an uplink or downlink between the first and second radio nodes 20, 30 that is associated with a first cell identifier. The other one of the two multifarious radio links 32-2 may be in the opposite direction and be a downlink or uplink, either between the first and second radio nodes 20, 30, or between one of said first and second radio nodes 20, 30 and another radio node in the wireless communication network 8. Here, the second link is associated with a second cell identifier, so that said enhanced timing measurement interrelates radio link timing across the first and second cell identifiers.

Still further, in some embodiments, the enhanced timing determination circuit 56, 80 is configured to compensate the enhanced timing measurement for at least one of: a cell timing misalignment between different cells 22 corresponding to different ones of the multifarious radio links 32 involved in the enhanced timing measurement; and a frequency-dependent propagation time difference between different carrier frequencies corresponding to different ones of the multifarious radio links 32 involved in the enhanced timing measurement.

Figure 7:
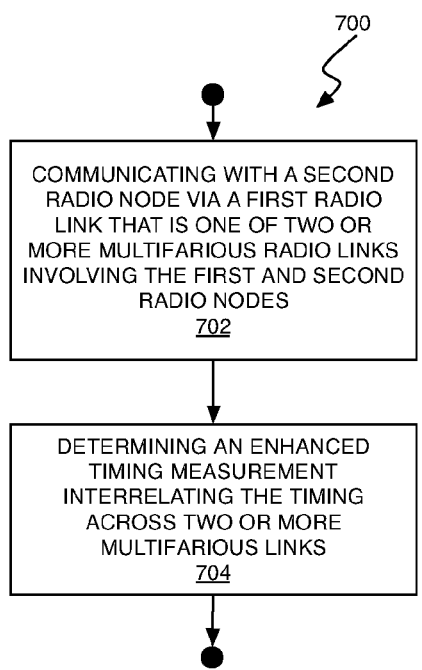
FIG. 7 is a logic flow diagram of one embodiment of a method of enhanced timing measurement at a radio node, such as a base station or a UE.

FIG. 7 illustrates a method 700 of making enhanced timing measurements at a radio node 20, 30. The method 700 is performed at a first radio node 20, 30 and includes communicating with a second radio node 20, 30 via a first radio link 32-1 that is one of two or more multifarious radio links 32 involving the first and second radio nodes 20, 30 (Block 702). The method 700 further includes determining an enhanced timing measurement that interrelates radio link timing across the two or more multifarious radio links 32-1, 32-2 (Block 704). As an example, the radio node 20, 30 is a first base station 20 that has an uplink or downlink with a UE 30, where that UE 30 has another uplink or downlink, possibly in the opposite direction with a second base station 20, and where the enhanced timing measurement by the first base station 20 interrelates radio link timing across the uplink or downlink it has with the UE and the other link the second base station 20 has with the UE 30. In this regard, the second base station 20 may share radio link timing information with the first base station 20, so that the first base station 20 can determine the enhanced timing measurement.

Figure 9:
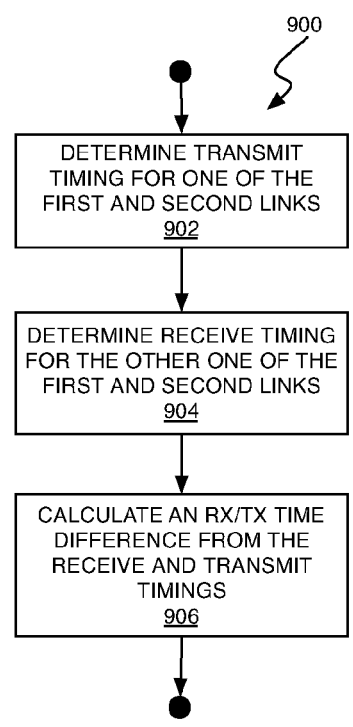
FIG. 9 is a logic flow diagram illustrating an example case of making an enhanced timing measurement within the context of the method introduced in FIG. 7.

With the above in mind, the method 900 shown in FIG. 9 can be understood as a more detailed example of the method 700. The method 900 includes determining a transmit timing for one of first and second multifarious radio links 32-1 and 32-2 (Block 902), determining a receive timing for the other one of the first and second radio links 32-1 and 32-2 (Block 904), and calculating an RX/TX time difference from the RX and TX timings (Block 906). This can be understood in an example case, as a UE 30 interrelating the receive time of a radio frame received by the UE 30 on the first radio link 32-1 with the transmit time of a radio frame transmitted by the UE 30 on the second radio link 32-2, so that the RX/TX time difference spans the different pairs of radio nodes and/or different cell identifiers (Cell ID or CID) associated with the first and second radio links 32-1 and 32-2.

Further, a given radio node 20, 30 reports enhanced timing measurements for any one or more operations, including one or more of: location determination, network planning or optimization, configuration of handover parameters, and coordination of time-based scheduling by the network 8. For example, the radio node 20, 30 is configured to report the enhanced timing measurement, or a value derived therefrom, to a positioning node 40, for use in determining a position of the UE 30.

The radio node 20, 30 is, in some embodiments, configured to compensate enhanced timing measurements. For example, the radio node 20, 30 compensates an enhanced timing value for a timing misalignment or time alignment error between the multifarious radio links 32 involved in the enhanced timing measurement. Additionally, or alternatively, the radio node 20, 30 compensates the enhanced timing measurement according to a frequency-dependent compensation value corresponding to propagation time differences arising from the use of different frequencies between the involved multifarious radio links 32.

Figure 10:
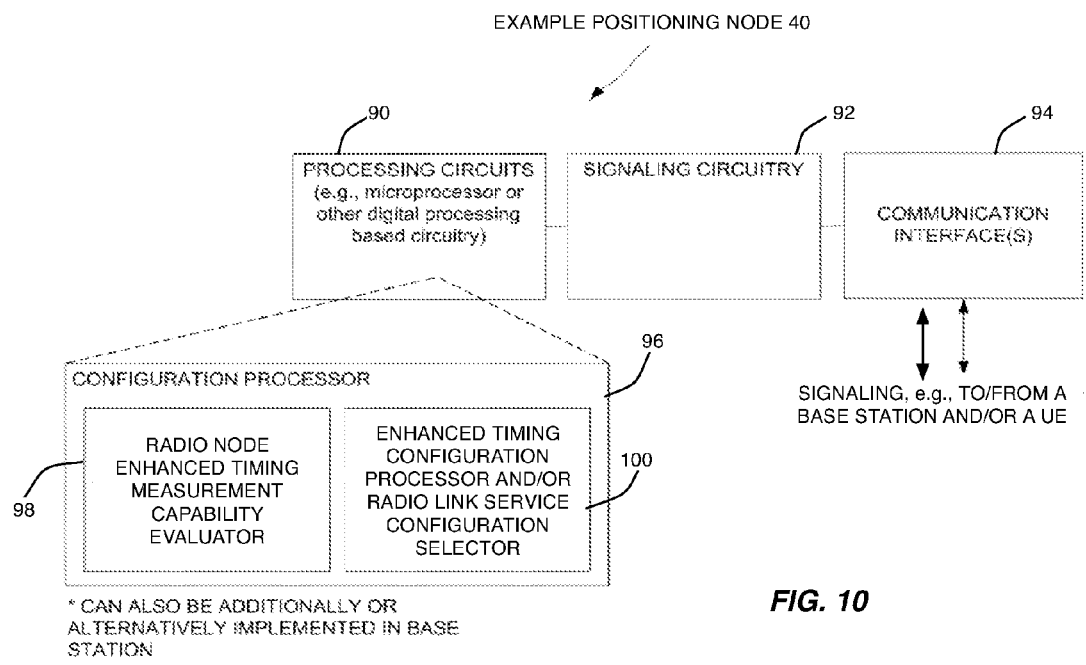
FIG. 10 is a block diagram of one embodiment of a node in a wireless communication network, e.g., a positioning node in a core network, that is arranged to evaluate enhanced timing measurement capabilities of radio nodes, and to configure enhanced timing measurements for such nodes.

FIG. 10 illustrates a positioning node 40 according to one embodiment. It will be understood that this figure represents an example of a node in the network 8 that is configured to provide enhanced timing measurement configuration services. The illustrated positioning node 40 includes one or more processing circuits 90, associated signaling circuitry 92, and one or more communication interfaces 94. In an example configuration, the one or more processing circuits 90 include, at least in terms of logical or functional circuit arrangements, a configuration processor 96, which includes a capability evaluation circuit 98 and which also may be referred to as a capability evaluation unit, and a configuration selection circuit 100, which also may be referred to as configuration selection unit.

The communication interface(s) 94 are configured for communicating with base stations 20 and/or with UEs 30. Correspondingly, the one or more processing circuits 90 are configured to receive enhanced timing measurement capability information from a radio node 20, 30, and to determine an enhanced timing measurement configuration to be used by the radio node 20, 30. For example, the capability evaluation circuit 98 is configured to evaluate the received capability and provide the results of that evaluation to the configuration selection circuit 100, for example, which is configured to select or otherwise determine an enhanced timing measurement configuration to be used by the radio node 20, 30. Such a determination may be made with further knowledge of network configuration information relevant to making an enhanced timing measurement at the radio node 20, 30.

The processing circuit(s) 90 are further configured to send signaling, e.g., via the signaling circuitry 92 and communication interfaces 94, that indicates the enhanced timing measurement configuration to the radio node 20, 30 in question. Such signaling will therefore be understood as controlling the enhanced timing measurement(s) performed by the radio node 20, 30.

Figure 11:
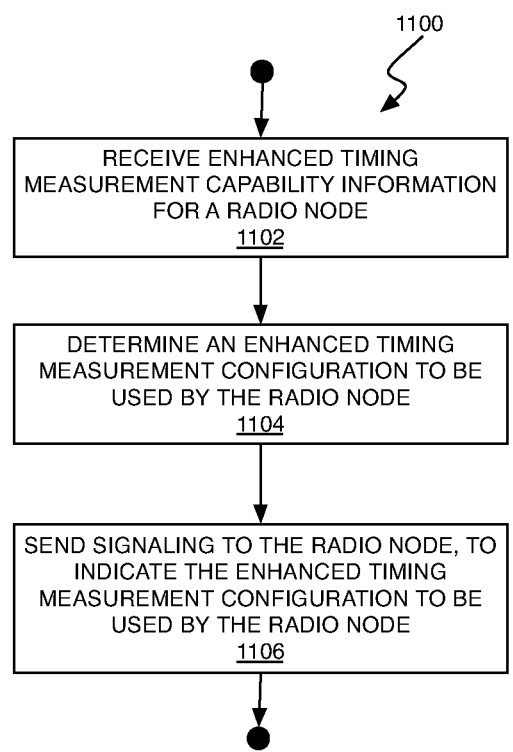
FIG. 11 is a logic flow diagram of one embodiment of a method of configuring enhanced timing measurements for a radio node.

The above functionality may also be implemented in a base station 20, for example, for use in configuring the enhanced timing measurements by UEs 30, and/or may be implemented in an OMA node 42, or other network node. Regardless, FIG. 11 depicts a corresponding example method 1100, which includes receiving enhanced timing measurement capability information for a radio node 20, 30 (Block 1102). The enhanced timing measurement capability information indicates whether or to what extent the radio node 20, 30 can make enhanced timing measurements involving multifarious radio links 32.

The method 1100 further includes determining an enhanced timing measurement configuration to be used by the radio node 20, 30, based on said enhanced timing measurement capability information and further based on network configuration information applicable to enhanced timing measurements to be made by the radio node (Block 1104), and sending signaling indicating said enhanced timing measurement configuration to the radio node 20, 30, to control the enhanced timing measurements performed by the radio node 20, 30 (Block 1106).

The method 1100 also may include compensating an enhanced timing measurement for one or more of cell timing differences and frequency-dependent propagation time differences between the multifarious radio links 32 on which the enhanced timing measurement is based. Still further, the method 1100 may include determining the enhanced timing measurement configuration by selecting which multifarious radio links 32 are to be used by the radio node 20, 30 in making the enhanced timing measurement, where the selecting is based on minimizing a frequency distance between two or more of the multifarious radio links 32 that are to be used.

Broadly, the signaling described immediately above and elsewhere herein is either via direct links or logical links, e.g. via higher layer protocols and/or via one or more network nodes. In an LTE-based example involving signaling between an E-SMLC and a Location Services (LCS) client, a positioning result may be transferred via multiple nodes, e.g., at least via an MME and/or a Gateway Mobile Location Center (GMLC).

Additionally, it should be understood by one skilled in the art that "UE" as used herein is a non-limiting term that means any wireless device or node capable of receiving in the DL and transmitting in the UL, e.g. PDA, laptop, mobile, sensor, fixed relay, mobile relay or even a radio base station, e.g., a femto base station.

Further, the term "positioning node" should be construed broadly. In an LTE example, the positioning node 40 comprises a positioning platform in the user plane, e.g., SLP in LTE, or a positioning node in the control plane, e.g., E-SMLC in LTE. The SLP may also consist of an SLC and SPC, where the SPC may also have a proprietary interface with the E-SMLC. Here, SLP denotes a "SUPL Location Platform," SPC denotes a SUPL Positioning Center, E-SMLC denotes "Evolved Serving Mobile Location Center," and SUPL denotes "Secure User Plane Location."

As noted for this disclosure, the term "radio node" denotes base stations 20 and UEs 30 and should be given broad construction unless a narrower understanding it disclosed in context. Non-limiting examples of radio nodes in the LTE case include eNodeBs or home eNodeBs. Of course, such nodes also may be a macro/micro/pico base station, a relay node, beacon device, or repeater.

A radio node 20, 30 may operate in one or more frequencies or frequency bands, and thus may provide or use more than one carrier. Further, a base station 20 or UE 30 may be capable of CA-based operation. A radio node 20, 30 as contemplated herein may also be a single- or multi-RAT node, where RAT denotes "Radio Access Technology". A multi-RAT version of a radio node 20, 30 supports multi-standard radio (MSR), or may otherwise be a mixed radio node that is configured to communicate via two or more RATs.

Several of the above examples were cast in the LTE context and the teachings herein offer advantages in that context. However, the teachings herein are not limited to LTE. Indeed, they apply to essentially any type of Radio Access Network (RAN), including those using single- or multi-RAT access. Examples of other applicable network types include but are not limited to LTE Advanced, UMTS, HSPA, GSM, cdma2000, HRPD, WiMAX, and WiFi.

This broad applicability highlights one of the several advantages of the teachings presented herein. In particular, in conventional approaches to timing measurements involving more than one radio link, it is generally assumed that such timing measurements will involve, e.g., DL and UL signals associated with co-located transmission and reception points and DL and UL signals associated with the same cell identification. In other words, a conventional determination of radio link timing across an uplink and a downlink assumes that the uplink and downlink are between the same base station and UE and that the uplink and the downlink are associated with the same cell identifier, which implies, among other things, that the uplink and downlink are in the same carrier frequency band.

In contrast, the methods and apparatus disclosed herein enable enhanced timing measurements involving multifarious radio links. It will be appreciated that the ability to determine such enhanced timing measurements across radio links 32 involving different RATs, cell locations and/or IDs, different carrier frequencies/frequency bands, etc., enable a radio node 20, 30 configured according to the teachings herein to make enhanced timing measurements within heterogeneous networks, including measurements between or across heterogeneous cells—e.g., to interrelate radio link timing across a macro-cell downlink and an pico-cell uplink, or vice versa.

This ability further contrasts with conventional timing measurements, which as a general proposition do not make enhanced timing measurements across heterogeneous radio links. More specifically, conventional approaches to making radio link timing measurements are based on the measurements involving "homogeneous links," meaning that the involved UL and DL belong to the same cell, the same band, the same RAT, or the same location and PCC, for both UL and DL measurement, or SCC, for both UL and DL measurement.

By way of example, according to this disclosure, enhanced timing measurements can be made across or between two or more radio links 32 that are opposite in terms of uplink and downlink transmit directions and are: associated with different cells 22 in the same frequency band; associated with different cells 22 belonging to different frequency bands and/or different RATs; associated with different pairings of radio nodes 20, 30, e.g., in DAS or CoMP systems, or systems employing RRHs, having the same or different carrier frequencies; associated with cells 22 having multiple transmitters and/or multiple receivers, where more than one transmitter and/or more than receiver may be associated with the same cell 22; associated with a cell 22 or cells 22 belonging to Component Carrier CC1 with frequency f11 and CC2 with f22, respectively, in a CA service scenario, e.g., where carrier frequencies f11 and f22 belong to different bands; or radio links 32 involving the Pcell, or any other cell 22 on the PCC, and involving the Scell, or any other cell on the SCC, respectively, in a CA service scenario, or vice versa.

Of course, it will be understood that determining enhanced timing measurements for multifarious radio links can also be applied to combinations of the immediately foregoing examples. Further, the above scenarios apply to timing measurements done by a UE 30 and/or by a base station 20. The disclosed enhanced timing measurements interrelate radio link timing on multifarious radio links 32, thereby leading to better performance in several practical scenarios. For example, assume that a DL measurement component of the timing measurement is performed for cell 1 and the corresponding UL measurement component of the same timing measurement is performed for cell 2. In this case, at least the following situations may be envisioned: cell 1 and cell 2 may or may not be characterized by the same cell identifier; the transmission point of cell 1 (DL) and the receiving point of cell 2 (UL) may or may not be co-located; the receiving point of cell 1 (DL) and the transmission point of cell 2 (UL) may or may not be co-located; cell 1 and cell 2 may belong to the same or different carrier frequencies, carrier components, bands, RATs, etc.; one of cell 1 or cell 2 may be the serving cell or Pcell in a CA system configuration; at least one of cell 1 or cell 2 may belong to the serving carrier frequency or primary carrier component in a CA system configuration.

In the case where a DL timing measurement is performed for cell 1 and an UL timing measurement is performed for cell 2, such multifarious measurements may be used, e.g., for eNodeB Rx-Tx measurements, such as in DAS or CoMP service scenarios. Similarly, the multifarious link timing measurement teachings herein permit radio links 32 associated with different pairs of UL reception and DL transmission points to be used for UE Rx-Tx measurements, such as in DAS or CoMP service scenarios.

Further examples of radio links 32 that are multifarious include these: although cell 1 and cell 2 are co-located, the UL is associated with cell 2 and operates on frequency f22, while the DL is associated with cell 1 and operates on frequency f11; the UL is associated with cell 2 on frequency f21 and the DL is associated with cell 1 on frequency f11, and cells 1 and 2 are not co-located; the UL is associated with cell 2 on frequency f21 and the DL is associated with cell 1 on f11 and the cells 1 and 2 are not co-located; the DL is associated with cell 1 and is on frequency f11, the UL is associated with cell 2 and is on frequency f21, where the cells 1 and 2 have different cell identifiers, such as used in the case where the UL and DL cell coverage/service areas differ; the DL is associated with cell 1 and operates on frequency f11 and the UL is also associated with cell 1, operating on frequency f21, but there are multiple UL transmitters and DL receivers.

Note that these Frequency Duplex Division (FDD) examples are non-limiting and similar examples apply to Time Division Duplex (TDD) bands. Further, note that "fxy" as used in the immediately above examples denotes a carrier frequency of "x" belonging to frequency band "y". In the case of FDD or HD-FDD, "x" is different for signals transmitted in the uplink and downlink. For example in FDD, frequencies f11 and f21 correspond to uplink and downlink carriers respectively belonging to FDD band 1. Similarly, in TDD, frequencies f13 corresponds to both uplink and downlink carriers belonging to TDD band 3.

In one further example embodiment, there may be a split into multiple carriers within one frequency band, e.g., any of band 1 and band 40, which are among the defined E-UTRA frequency bands identified in 3GPP TS 36.104, v10.2. Splitting within one frequency band permits, for example, the use of two or more carrier components (CCs) to enable intra-band contiguous CA. The enhanced timing measurements described herein for multifarious radio links may therefore also be defined over any two of the CCs within any of the bands, i.e., such measurements may be intra-band measurements. In another example, the timing measurements described herein may be defined for inter-band non-contiguous CCs, e.g. in operating bands 1 and 5.

Another aspect of the teachings herein involves the configuration of a radio node 20, 30 to make enhanced timing measurements. Various criteria may be considered for selecting the multifarious radio links 32 suitable for making enhanced timing measurements involving at least an uplink measurement by the radio node 20, 30. Example information to consider include the frequencies, CCs, bands, RATs, etc. selected for making an enhanced timing measurement are chosen, for example, based on a comparison of the available cells 22, frequencies, bands, and RAT information for the multifarious radio links 32 available for making the enhanced timing measurement. Such information may be regarded as "network configuration information," and may be considered when determining an enhanced timing measurement configuration, to control the enhanced timing measurement made by a radio node 20, 30.

It is also contemplated herein that network configuration information is provided to a positioning node 40, OMA node 42, or other node in the network 8 that provides enhanced timing measurement configuration services, where such a node evaluates the network configuration information applicable to enhanced timing measurements made or to be made at a radio node 20, 30.

In one example, an enhanced timing measurement configuration defines or otherwise limits the absolute frequency difference permitted between DL and UL links. Such information establishes at a base station 20 and/or at a UE 30 which radio links 32 are available for selection among the multifarious radio links 32 that are candidates for use in an enhanced timing measurement. The absolute frequency difference may be indicated as a threshold, or the rule may be to select radio links 32 that yield the smallest frequency difference, e.g., to select multifarious pairings of radio links 32 that have the smallest frequency distances.

Additionally, or alternatively, the enhanced timing measurement configuration includes a parameter or other indication relating to the distance difference between a transmission point in the DL and a receiving point in the UL, or a transmission point in the UL and a receiving point in the DL. In this regard, the enhanced timing measurement configuration may indicate that the entity making the enhanced timing measurement should select radio links 32 that yield the smallest distance difference, or that result in a distance difference that does not exceed a certain threshold.

In another example, for UEs 30 requiring measurement gaps on at least some frequencies or CCs, the enhanced timing measurement configuration may be structured to avoid the need for using measurement gaps, if they are not currently used, or avoiding reconfiguring any already configured measurement gaps. It is also emphasized that the association between DL and UL for a frequency band or frequency carrier is typically either pre-defined or determined from system information, e.g., known from system information broadcast, e.g., for CA systems. In some embodiments, the DL and UL frequencies/bands/RATs configured for use in making enhanced timing measurements may be different from a combination that is pre-defined or determined by the general system configuration. Therefore, it may not be sufficient to provide only the DL or only the UL information to the entity configuring enhanced timing measurements. Likewise, it may be insufficient to provide only the DL or only the UL frequency information in enhanced timing measurement configuration information sent to a base station 20 and/or a UE 30, or when reporting an enhanced timing measurement from a radio node 20, 30 to another node.

As another consideration, the capabilities (or lack thereof) of an entity, e.g., a base station 20 or UE 30, regarding its ability to make enhanced timing measurements on radio links 32 that are multifarious may be used when selecting or otherwise generating enhanced timing measurement configuration information. Example reporting includes these items: a UE (30) reporting to an eNB using Radio Resource Control (RRC) signaling; an eNB reporting to another eNB using X2 or RRC signaling; reporting to a core network node, e.g. an MME using NAS signaling; and reporting to a positioning node 40, e.g. to an E-SMLC using a positioning protocol such as LPP, LPPe, LPPa, etc. Thus, a UE 30 may report its enhanced timing measurement capability information to a base station 20, which may forward it or share it with another base station 20, a positioning node 40, or another network node, such as an MME 14 or OMA node 42. In one example, indicating the "capability" of a UE 30 to make enhanced timing measurements includes indicating whether or to what extent the UE 30 can make timing measurements on multiple frequencies/bands.

Additionally or alternatively, enhanced timing measurement capabilities may be defined as any one or more of: general capabilities, e.g., communicated via RRC or through the S1 interface or X2 or similar interface; service-specific capabilities, e.g. positioning capabilities such as common positioning capabilities or E-CID positioning capabilities, e.g., communicated via LPP, LPPe or LPPa or similar interface between a coordinating node and radio node or X2 or similar interface; and deployment-specific capabilities, e.g., HetNet- or CoMP- or DAS-related capabilities or capabilities related to the use of relays or sensors.

The capabilities may also be associated with the support of CA functionality. Such capabilities may be defined for any one or more of: a UE 30, a base station 20, such as e.g., eNodeB, LMU, relay, femto CSG base station, etc., another type of network node, such as e.g., positioning node 40, OMA 42, SON, etc. Note that although network nodes typically do not perform radio measurements, they may still comprise, e.g., processing units that enable processing of enhanced timing measurements.

In other examples, enhanced timing measurement capabilities include or relate to any one or more of these items: support of a timing measurement based on specific physical or reference signals or physical or logical channels, e.g., Sounding Reference Signals (SRS) common, SRS dedicated, Cell Specific Reference Signals (CRS), synchronization signals, Demodulation Reference Signals (DM RS), DL data channel, UL data channel, DL control channel, UL control channel; support of intra-band timing measurements with DL measurements on carrier frequency or CC f1 and UL measurements on carrier frequency or CC f2; and support of inter-band timing measurements with DL measurements on carrier frequency or CC f11 and UL measurements on carrier frequency or CC f22, or vice versa, where the multifarious support may also be limited to a certain combination of frequency bands or for certain band combinations, e.g., only for band 17+band 2 or band 13+band 2, etc. Additionally, or alternatively, the enhanced measurement timing capabilities include any of the following abilities: DL and UL measurements can be performed on different cells 22 belonging to different carrier frequencies when the radio link 32 on one carrier frequency is not between the same transmit/receive pair of nodes as the radio link 32 on another carrier frequency or where the different radio links 32 involve different, non co-located base stations 20; DL and UL measurements can be performed on radio links 32 associated with different CCs in CA; DL and UL measurements can be performed on cells 22 belonging to different frequency bands; DL and UL measurements can be performed on cells 22 belonging to different RATs, the RATs may also be specified in the enhanced measurement capability information, e.g., a UE 30 supporting GSM, HSPA and LTE may only support this measurement capability for HSPA/LTE; DL and UL measurements can be performed on cells 22 or radio links 32 associated with different cell identifications or node identifications, including cells 22 on the same frequency or CC; DL and UL measurements for a combination of frequencies or CCs or bands or RATs which are different, e.g., from a predefined combination or from a combination indicated in broadcast system information; DL and UL measurements can be performed on radio links 32 associated with non co-located DL transmitter and UL receiver; DL and UL measurements can be performed on radio links 32 associated with non co-located UL transmitter and DL receiver; DL and UL measurements can be performed on radio links 32 associated with multiple non co-located DL transmitters and/or UL receivers; DL and UL measurements can be performed on radio links 32 associated with Primary Component Carrier (PCC) or Pcell and Secondary Component Carrier (SCC) or Scell respectively, or vice versa, or both.

Any of the above enhanced timing measurement capabilities may be associated with another such capability. For example, a specific timing measurement type may be supported by a node for certain frequency band(s), band combination(s), type of carrier aggregation, e.g. intra-band, inter-band, intra-band non-contiguous, etc., and transmission and/or reception antenna configurations etc. As an example, assume a UE 30 supports E-UTRA bands 1, 5, 7 and 8. The same UE 32 may report enhanced timing measurement capability information indicating that it supports certain capabilities, e.g. measurements on DL/UL signals from non co-located sites, only for band 1 and band 8. It may also be predefined that certain capabilities are only supported for certain bands or band combinations, such as where UEs 30 are required to support DL/UL measurement across different bands only for bands above 1 GHz.

Further, enhanced timing measurement capabilities may also relate to the ability to support spatial diversity, e.g., with CoMP, RRH, MIMO, etc. Such capabilities can be indicated in signaling sent from a UE 30 and/or base station 20, and can be forwarded to or otherwise shared with a positioning node 40. The positioning node 40 may be responsible for positioning related tasks only, but it also may perform other tasks. Examples of such other tasks are configuration of measurements related to SON, MDT, network planning etc. Positioning node examples include these items: an E-SMLC or SLP in LTE; a MDT node, which may also configure and use positioning measurements; a SON node, which may also configure and use positioning measurements; and a network planning and configuring node, which may also configure and use positioning measurements.

The spatial diversity capabilities and/or other enhanced timing measurement capabilities may be provided by a UE 30 and/or base station 20 without request or upon receiving an implicit or explicit request. In an example, a request for enhanced timing measurement capability information is sent to a UE 30 or to a base station 20, e.g., by a positioning node 40. Alternatively, another node or entity in the network 8 sends the request, e.g., a SON, MDT, OMA, OSS, etc.

It will also be understood that, in an example case, a base station 20 reports, e.g., to a positioning node 40, not only its own enhanced timing measurement capabilities, but also the enhanced timing measurement capabilities of a UE 30. Even where such reporting/forwarding is not used, it will be appreciated that there are many different multifarious cases or scenarios, e.g., for CoMP or RRH scenarios, including single carrier, intra-band multi-carrier, i.e., the aggregation of different carriers on different links, inter-band, soft combining, selective combining, etc. Hence, there may be different enhanced timing measurement capabilities for the base station 20 and/or the UE 30 for each such case or scenario.

As an example, a first UE 30 may support only intra-band CoMP and intra-band RRH, while another UE 30 supports only inter-band CoMP and inter-band RRH, and yet another UE 30 has all of the capabilities of the first and second UEs 30. Similarly, a first base station 20 may support only intra-band CoMP and RRH capabilities, while another base station 20 supports all CoMP and RRH capabilities. This scenario means that an example positioning node 40 will be configured to take into account both UE and base station capabilities when configuring a UE 30 to perform one or more enhanced timing measurements associated with multifarious radio links.

The base station 20 may even report the spatial diversity capabilities of the neighboring base stations 20 to a positioning node 40. Such reporting is particularly useful in that certain spatial diversity schemes, e.g. CoMP, RRH, etc., involve multiple radio links 32 and multiple base stations 20. In particular, the positioning node 40 may request the serving base station 20 of a particular UE 30 to report its own enhanced timing measurement capabilities and those of its neighboring base stations 20.

Another example involves a "master" node, e.g., a macro eNodeB, reporting the enhanced timing measurement capabilities of other base stations 20 that are within its coverage area. As an example, a macro base station 20 reports the enhanced timing measurement capabilities of any femto or pico eNodeBs positioned within its macro coverage area.

Further, it may be pre-defined that UEs 30 supporting certain spatial capability, e.g. CoMP, also support certain enhanced timing measurements, e.g., UE Rx-Tx time difference measurement over multifarious radio links. For example, this type of pre-defined rule can be imposed by specifying the performance requirements associated with making an enhanced timing measurement, e.g., measurement requirements such as measurement period, reporting delay, accuracy requirements etc. The pre-defined rule may also explicitly state that a UE 30 supporting certain spatial diversity schemes, e.g., CoMP, RRH, etc., shall also support certain types of enhanced timing measurements—i.e., it shall support certain enhanced timing measurements determined from two or more radio links 32 that are multifarious.

In at least one embodiment contemplated herein, the enhanced timing measurement capabilities described above are associated with other more general capabilities. For example, it may be required that all UEs 30 supporting carrier aggregation also support at least one of the enhanced timing measurements described herein for multifarious radio links. In another example, UEs 30 or base stations 20 supporting enhanced MIMO may be required to support at least one of the enhanced timing measurements described herein for multifarious radio links. In another example, UEs 30 or base stations 20 capable of operating in certain bands may need to support at least one of the enhanced timing measurements described herein for multifarious radio links. In another example, all UEs 30 supporting CoMP shall be required to support at least one of the enhanced timing measurements described herein for multifarious radio links.

Further, the above association of general capabilities, e.g., radio capabilities, and enhanced timing measurement capabilities may be predefined by the associated relevant standards. The associations can also be realized by appropriately defining the performance requirements, e.g. measurement and accuracy requirements, for certain timing measurements.

Also note that enhanced timing measurement capability reporting may not be needed in cases where certain enhanced timing measurement capabilities are required to be supported whenever certain general capabilities are supported. For example, if a UE 30 supports CA, then it may also be required to support one or more enhanced timing measurements involving multifarious radio links. As such, the network 8 will "know" that the UE 30 possesses at least the required enhanced timing measurement capabilities when the network 8 is apprised of the UE's ability to support CA.

For cases where enhanced timing measurement capabilities are reported, it should be noted that UE 30 and/or base stations 20 may report capability information proactively or only when requested or otherwise triggered. For example, a UE 30 may report its enhanced timing measurement capability during initial access procedures, or when setting up a service-related session, e.g. a positioning session. Furthermore, in some embodiments, an eNB or other base station 20 may solicit capability information from the UE 30 at any time.

As for acquiring network configuration information relevant to assessing or otherwise determining an enhanced timing measurement configuration, one or more entities, e.g., a positioning node 40, a base station 20, may acquire information indicating the actual radio configuration currently used or otherwise configured by the network 8, with respect to one or more base stations 20 and/or one or more UEs 30. The information can be acquired from one or more entities in the network 8, such as eNodeBs, RNCs, NodeBs, relay nodes, base stations/controllers, or from one or more UEs 30, or from a centralized node.

An example method of acquiring the network configuration information relevant to determining an enhanced timing measurement configuration is as follows:

(1) Identify the need for performing a timing measurement with at least one uplink, e.g., based on one or more of: a request from a positioning method selection entity, in association with a certain positioning method; periodically, upon a timer indication; on a random access attempt, e.g. when receiving a preamble; on intra-frequency, inter-frequency or inter-RAT handover or carrier switching in a CA system; on activation/deactivation of cells 22 in a CA system for uplink and/or downlink, e.g. an indication to indicate whether secondary cell(s) 22 on secondary uplink and/or downlink carriers are activated or deactivated; on link activation/deactivation in a CoMP or general DAS, or RRH or RRU, system, e.g., an indication to indicate whether radio link(s) 32 in uplink and/or downlink in CoMP or DAS systems are activated or deactivated; on changing the state from the IDLE to the CONNECTED mode; or to adjust the UE timing, etc.

(2) Identify the need for configuring the necessary signals to enable this timing measurement, comprising, e.g., at least: identifying the frequencies over which the measurement is to be performed; and identifying the nodes and/or cells to be involved in the measurement.

(3) Identify the need for acquiring the information related to the enhanced timing measurement capability of nodes and/or UE 30 to be involved in the measurement, which may comprise, for example: based on the identified nodes/cells and frequencies, identifying the missing information related to the enhanced timing measurement capabilities described herein.

(4) Acquire and compare the current configuration of the nodes/cells to be involved with a necessary configuration for performing an enhanced timing measurement and identifying whether the current configuration is sufficient.

This latter step may involve checking whether the information has been recently received e.g., from the involved nodes or SON node. If not, the method includes requesting information from a UE 30 or other involved node(s). The request may include a request for: the nodes/cells and frequencies associated with the current or potential CoMP or CA session; information about the necessary UL signals, e.g., whether SRS are configured or RACH may be used; information about necessary DL signals, e.g., CRS or dedicated RS; information related to interference conditions and interference coordination, e.g., whether HetNet is deployed on this frequency and whether enhanced interference coordination, such as ABS, is possible; activated/deactivated cells in a CA system in the uplink and/or downlink; activated/deactivated links 32 in the uplink and/or downlink in CoMP or DAS, or RRU or RRH, systems, etc.

Like in CA operation, it is also assumed that in CoMP and DAS deployments that comprise multiple radio links 32, one or more such links can be activated and deactivated by the supporting base station(s) 20. The deactivation is done by, e.g., an eNB using lower layer signaling, e.g. over the PDCCH. Such signaling may be a short command such as ON/OFF, e.g., using 1 bit for each radio link 32. The activation/deactivation command is sent to a UE 30 via the primary link. Typically the deactivation is done when there is no data to transmit on the secondary link(s), and this is one example timing measurements that may not be based on data transmissions. The activation/deactivation can be done independently on uplink and downlink secondary links, and this fact creates another aspect of the teachings presented herein for two-directional, enhanced timing measurements, e.g., Rx-Tx measurements. As the activations/deactivations change the radio configuration, corresponding enhanced timing measurement configurations and related information may be updated and/or exchanged as needed.

In a more general discussion of exchanging of network configuration information relevant to enhanced timing measurements at a base station 20 and/or a UE 30, it should be appreciated that parallel reporting may be used. For example, a base station 20 configures certain enhanced UE measurements involving multifarious radio links and indicates such to a positioning node 40. Similarly, a positioning node 40 may signal the information regarding enhanced UE timing measurements to a base station 20, or, more generally, any one or more nodes or entities in the network 8 exchange enhanced timing measurement configuration information for a base station 20 and/or a UE 30, and/or they exchange network configuration information that is relevant to determining an enhanced timing measurement configuration for a base station 20 and/or a UE 30. Such other nodes include an MDT node, a SON node, etc.

Such signaling enables network nodes, e.g., eNB, positioning node 40, to be aware of parallel measurements that a UE 30 or another base station 20 is presently performing. A UE 30 generally can handle a certain number of total timing measurements in parallel. There will also typically be a limit in terms of the total number of parallel UE enhanced timing measurements that can be performed. The network node that receives such information can determine the number of additional parallel reporting criteria that can be configured. The network node can also de-configure some of the existing ones to allow for configuring new enhanced timing measurements at the UE 30. This is particularly useful in case there are no pre-defined requirements for all enhanced timing measurements possible at the UE 30.

Further focusing on exchanging of parallel criteria related to the configuring and performing enhanced timing measurements, it is contemplated herein to exchange information about the enhanced timing measurement capabilities of a radio node or nodes 20, 30, and to enhanced timing measurement configuration information, e.g., from a positioning node 40, OMA 42, SON, etc. In particular, it is taught herein that network nodes exchange information about the configured enhanced timing measurements involving multifarious radio links 32, including parallel reporting criteria currently used or configured.

Consider these example cases: a base station 20 configures certain enhanced timing measurements at a UE 30 for two or more multifarious radio links 32, and indicates this configuration to a positioning node 40; or a positioning node 40 signals information indicating an enhanced timing measurement configuration for a UE 30 to base station 20; or an MDT node or SON or positioning node 40 signals enhanced timing measurement configuration information for one base station 20 to another base station 20. Further, in another example, a UE or another radio node signals the information about the enhanced timing measurements which are: configured by the first node (e.g. eNB) to the second node (e.g. positioning node); or configured by the second node (e.g. positioning node) to the first node (e.g. eNode B).

The above signaling mechanisms enable various nodes in the network 8 (e.g. eNB, positioning node) to be aware of parallel measurements that UE 30 or base station 20 is presently performing. The UE 30 can handle certain number of total timing measurements in parallel and there will typically be a limit in terms of total number of parallel UE enhanced timing measurements with multifarious radio links 32. The node which receives the above information about the enhanced timing measurements along with conventionally exchanged information (i.e., configured or pre-defined reporting criteria of conventional timing measurements) can determine the number of additional parallel reporting criteria that can be configured. The node can also de-configure some of the existing, conventional timing measurements to allow for configuring new enhanced timing measurements. This is particularly useful in case there are no pre-defined requirements for all possible enhanced UE measurements.

Of course, as noted earlier herein, the enhanced timing measurement configuration(s) used at a UE 30 or other radio node will depend on the enhanced timing measurement capabilities of the UE 30 and on the network configuration that is in play. Acquired/obtained enhanced timing measurement capabilities of the UE 30 and/or a base station 20 include: information regarding the support for spatial diversity and/or the multifarious radio links in use or available for use at the UE 30 and/or base station 20. Example of associated parameters to be configured as part of determining an enhanced timing measurement configuration are frequency bands associated with UL and DL measurements, cell identifiers of cells associated with UL and DL measurements, RATs associated with UL and DL measurements, location of transmit or receive points, etc.

As another example of configuring enhanced timing measurements, consider the following method, which includes the steps of: (1) configure the identified nodes/cells and/or UE to enable an enhanced timing measurement or measurements, including communicating enhanced timing measurement configuration information to the relevant nodes; (2) configure the UE and/or base station to perform the desired enhanced timing measurement(s); (3) receive the measurement(s) and any additional information, e.g., where the enhanced timing measurement involves spatial diversity, such may be indicated to trigger or support special processing, such as the application of a timing compensation to account for cell timing misalignment for example; (4) store the measurement for, for example, use with a radio measurement map, e.g., AECID map or SON map or MDT map; and (5) process the measurement where such processing may be determined by the enhanced timing measurement configuration or based on how the enhanced timing measurement was performed, e.g., RAT, frequencies, spatial diversity, etc.

It is contemplated herein that such processing may involve compensating an enhanced timing measurement obtained via an enhanced timing measurement involving radio links 32 that are multifarious. For example, because of the physical aspects of radio signal propagation, the signal propagation times may be different for different frequencies and different frequency bands. 3GPP standards provide an example of such error sources. Such standards specify that the timing error between any CCs belonging different bands can be up to 1.3 s. This timing difference means that an enhanced timing measurement determined for such CCs may need to be compensated for the timing difference.

More generally, when an enhanced timing measurement is made for signals at different frequencies, that measurement may include an error arising from differences in the radio signal propagation times associated with the different frequencies. This aspect can be incorporated into enhanced timing measurement configurations, e.g., by restricting the maximum frequency difference permitted between multifarious radio links 32 that are candidates for use in making an enhanced timing measurement.

Additionally, or alternatively, time alignment error between the radio links 32 used in CA, CoMP, DAS, RRH, RRU, etc., may be compensated. The compensation can be based on predetermined timing measurement requirements or on a current set of requirements. The compensation can be applied by a UE 30, by a base station 20, or by another entity, such as a positioning node 40. Compensation may comprise an offset or adjustment value, which may either be subtracted or added, depending on the reference frequency or the reference location. Thus, another aspect of the teachings herein is that the reference location and/or reference frequency are selected according to a pre-defined rule, e.g. such as any one or more of the below: the reference frequency is the lowest of the DL and UL frequencies; the reference frequency is a pre-defined frequency, e.g., corresponding to 700 MHz; the reference frequency is that corresponding to the serving cell frequency or primary CC; the reference location is that corresponding to the closest cell; the reference location is that corresponding to the serving cell or Pcell; the reference frequency and/or reference location are associated with DL transmissions; or the reference frequency and/or reference location are associated with UL transmissions.

The amount of compensation applied to an enhanced timing measurement can be decided by the internal implementation of the entity applying the compensation, or it may be configured according to signaling received from another entity. The timing compensation applied to a given enhanced timing measurement also may be determined from a pre-defined mapping relating the amount of compensation to the frequency difference, distance difference, etc. Timing compensation values also may be determined from timing measurement statistics collected in the network 8 and/or the UE 30. In a UE timing adjustment example—see TS 36.331—the amount of the timing adjustment signaled to the UE 30 is based on the timing measurement statistics collected in the network 8.

With the above in mind, the teachings disclosed herein provide a number of advantages, including but not limited to more flexibility for multi-carrier systems and/or various deployments such as DAS/CoMP, relays, etc. Further advantages are provided in that such teachings enable enhanced timing measurements involving frequency bands for which the UL may be not configured, e.g., standalone DL only band 700 MHz service, which has no UL carrier. Such a DL band may be linked with one or more UL carriers belonging to another band, e.g. to band 2 or band 4 in the E-UTRAN band definitions. Still further, one or more embodiments presented herein enables UL and DL measurements on cells/radio links/CCs belonging to different bands, or where the different radio links involve different, non co-located pairs of DL transmission and UL reception points, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A first radio node configured for operation in a wireless communication network and comprising:
   a wireless communication transceiver configured to communicate with a second radio node in the wireless communication network via a first multifarious radio link that is multifarious with respect to a second multifarious radio link that involves the first or second radio node; and
   an enhanced timing determination circuit configured to determine an enhanced timing measurement by interrelating radio link timing across the first and second multifarious radio links;
   wherein said first multifarious radio link is multifarious with respect to the second multifarious radio link because the second multifarious radio link is opposite in terms of uplink and downlink transmit directions with respect to the first multifarious radio link and further because the second multifarious radio link is associated with a different cell identifier than the first multifarious radio link and because the second multifarious radio link is between either the first radio node and another radio node that is not said second radio node or is between the second radio node and another radio node that is not said first radio node, and
   wherein the first radio node further comprises an enhanced timing measurement configuration circuit that is operatively associated with the wireless communication transceiver and the enhanced timing determination circuit and is configured to perform at least one of:
      reporting an enhanced timing measurement capability of the first radio node, so that one or more other radio nodes and/or network nodes in said wireless communication network are apprised of said enhanced timing measurement capability; and
      configuring the enhanced timing measurement to be made by the enhanced timing determination circuit in response to enhanced timing measurement configuration information received from another radio node or network node in the wireless communication network, wherein the enhanced timing measurement configuration information includes a value indicating the maximum carrier frequency distance permissible, wherein configuring the enhanced timing measurement includes: selecting which of the first and second multifarious radio links that are to be used in making the enhanced timing measurement such that differences in carrier frequencies do not exceed the maximum carrier frequency distance permissible; and selecting a type of timing measurement to be performed as said enhanced timing measurement,
   wherein the enhanced timing measurement comprises any one of: an Rx-Tx time difference measurement that interrelates the first and second multifarious radio links; a round trip time (RTT) measurement that interrelates the first and second multifarious radio links; and a Timing Advance or one-way propagation delay measurement for one of said first and second multifarious radio links determined in dependence on a timing of the other one of said first and second multifarious radio links.

2. The first radio node of claim 1, wherein, for the case where the first multifarious radio link is transmitted by the first radio node, the second multifarious radio link is transmitted by the second radio node, and for the case where the first radio link is transmitted by the second radio node, the second multifarious radio link is transmitted by the first radio node, and further wherein the enhanced timing determination circuit is configured to interrelate a receive timing measured or known for one of the first or second multifarious radio links with a transmit timing measured or known for the other one of the first or second multifarious radio links, thereby interrelating transmit and receive timings across the different pairs of radio nodes and/or across the different cell identifiers.

3. The first radio node of claim 1, wherein the first radio node is configured to operate in a carrier aggregation (CA) or a coordinated multipoint (CoMP) configuration with respect to the second radio node and wherein the first multifarious radio link is a primary or serving carrier and the second multifarious radio link is a secondary carrier.

4. The first radio node of claim 1, wherein the first multifarious radio link is at a first frequency band and the second multifarious radio link is at a different, second frequency band, said enhanced timing measurement thereby interrelating radio link timing across the first and second frequency bands.

5. The first radio node of claim 1, wherein the first radio node comprises one of a base station or a user equipment (UE).

6. The first radio node of claim 1, wherein the first and second multifarious radio links comprise an uplink associated with a first cell identifier and a downlink associated with a second cell identifier, and wherein said enhanced timing measurement interrelates radio link timing across the first and second cell identifiers.

7. The first radio node of claim 1, wherein the enhanced timing determination circuit is configured to compensate the enhanced timing measurement for at least one of: a cell timing misalignment between different cells corresponding to the first and second multifarious radio links; and a frequency-dependent propagation time difference between different carrier frequencies used for the first and second multifarious radio links.

8. A method of radio link timing measurement at a first radio node in a wireless communication network, said method comprising:
communicating with a second radio node in the wireless communication network via a first multifarious radio link that is multifarious with respect to a second multifarious radio link involving the first or second radio node; and
determining an enhanced timing measurement at the first radio node by interrelating radio link timing across the first and second multifarious radio links;
wherein said first multifarious radio link is multifarious with respect to the second multifarious radio link because the second multifarious radio link is opposite in terms of uplink and downlink transmit directions with respect to the first multifarious radio link and further because the second multifarious radio link is associated with a different cell identifier than the first multifarious radio link and because the second multifarious radio link is between either the first radio node and another radio node that is not said second radio node or is between the second radio node and another radio node that is not said first radio node;
wherein the method further comprises performing at least one of:
reporting an enhanced timing measurement capability of the first radio node, so that one or more other radio nodes and/or network nodes in said wireless communication network are appraised of said enhanced timing measurement capability; and
configuring the enhanced timing measurement in response to enhanced timing measurement configuration information received from another radio node or network node in the wireless communication network, wherein the enhanced timing measurement configuration information includes a value indicating the maximum carrier frequency distance permissible, wherein configuring the enhanced timing measurement includes:
selecting which of the first and second multifarious radio links that are to be used in making the enhanced timing measurement such that differences in carrier frequencies do not exceed the maximum carrier frequency distance permissible; and
selecting a type of timing measurement to be performed as said enhanced timing measurement,
wherein the enhanced timing measurement comprises any one of: an Rx-Tx time difference measurement that interrelates the first and second multifarious radio links; a round trip time (RTT) measurement that interrelates the first and second multifarious radio links; and a Timing Advance or one-way propagation delay measurement for one of said first and second multifarious radio links determined in dependence on a timing of the other one of said first and second multifarious radio links.

9. The method of claim 8, wherein, for the case where the first multifarious radio link is transmitted by the first radio node, the second multifarious radio link is transmitted by the second radio node, and for the case where the first multifarious radio link is transmitted by the second radio node, the second multifarious radio link is transmitted by the first radio node, such that the enhanced timing measurement thereby interrelates transmit and receive timings across the different pairs of radio nodes and/or across the different cell identifiers.

10. The method of claim 8, wherein the first radio node is configured to operate in a carrier aggregation (CA) or a coordinated multipoint (CoMP) configuration with respect to the second radio node and wherein the first multifarious radio link is a primary or serving carrier and the second multifarious radio link is a secondary carrier.

11. The method of claim 8, wherein the first multifarious radio link is at a first frequency band and the second multifarious radio link is at a different, second frequency band, said enhanced timing measurement thereby interrelating radio link timing across the first and second frequency bands.

12. The method of claim 8, wherein the first radio node comprises one of a base station or a user equipment (UE).

13. The method of claim 8, wherein the first and second multifarious radio links comprise a uplink associated with a first cell identifier and a downlink associated with a second cell identifier, and wherein said enhanced timing measurement interrelates radio link timing across the first and second cell identifiers.

14. The method of claim 8, further comprising compensating the enhanced timing measurement for at least one of:
a cell timing misalignment between different cells corresponding to the first and second multifarious radio links; and
a frequency-dependent propagation time difference between different carrier frequencies used for the first and second multifarious radio links.

* * * * *